United States Patent [19]

Carlin

[11] Patent Number: 4,520,471
[45] Date of Patent: May 28, 1985

[54] MULTI-CHANNEL RECORDING/PLAYBACK OPTICS FOR LASER DIODE ARRAYS

[75] Inventor: Donald B. Carlin, Robbinsville, N.J.

[73] Assignee: RCA Corporation, Princeton, N.J.

[21] Appl. No.: 464,559

[22] Filed: Feb. 7, 1983

[51] Int. Cl.³ .......................... G11B 7/00; G11B 7/14; G02B 13/08
[52] U.S. Cl. .................. 369/112; 369/122; 358/347; 358/294
[58] Field of Search ............... 369/121, 122, 112, 45; 358/347, 294; 350/DIG. 1, 502, 400; 331/DIG. 1; 372/43

[56] References Cited

U.S. PATENT DOCUMENTS

| | | | |
|---|---|---|---|
| 3,396,344 | 8/1968 | Broom | 331/94.5 |
| 4,051,528 | 9/1977 | Takeda et al. | 358/128 |
| 4,222,071 | 9/1980 | Bell et al. | 258/128.5 |
| 4,272,651 | 6/1981 | Yoshida et al. | 369/112 |
| 4,298,974 | 11/1981 | Tsunoda et al. | 369/45 |
| 4,301,527 | 11/1981 | Tsunoda et al. | 369/45 |
| 4,333,173 | 6/1982 | Yonezawa et al. | 369/45 |
| 4,397,527 | 8/1983 | Geyer | 369/112 X |

Primary Examiner—Robert L. Richardson
Attorney, Agent, or Firm—Joseph S. Tripoli; Robert L. Troike; Christopher Lyle Maginniss

[57] ABSTRACT

An optical record and playback system is described for use in a multi-channel data processing system. An optical head which includes a laser diode array comprises a collection objective, an anamorphic beam expander and a focusing lens. The optical head collects the laser beams emitted by the diode array, expands the beam cross-section to form circular beams and focuses the beams to diffraction limited spots.

7 Claims, 4 Drawing Figures

MULTI-CHANNEL RECORDING/PLAYBACK OPTICS FOR LASER DIODE ARRAYS

The government has rights in this invention pursuant to a government contract.

This invention relates generally to apparatus for optically reading and recording high density information, digital or analog, on the surface of a record medium and, more particularly, to apparatus for optically reading and recording data at extremely high data rates where multiple beams are used.

BACKGROUND OF THE INVENTION

Optical recording/playback of information has been made possible by developments in the areas of lasers and thermal record media. Recent developments have led to mass data storage systems utilizing a plurality of individually modulated laser beams to record information at extremely high data rates. For example, in U.S. Pat. No. 4,449,212 issued May 15, 1984 to C. W. Reno, a multi-track record/playback apparatus is described. In the Reno apparatus the light beam from a single high power laser is split into a plurality of beams which are individually modulated and focused on the surface of a record medium. In general, systems of the Reno type require large, high power lasers which require external cooling. Furthermore, in these systems a modulator is provided to individually modulate each beam of the multiple beams being used for recording. For these reasons, prior art multi-beam systems tend to be bulky, low in efficiency, and difficult to modulate.

The development of semiconductor laser arrays is the first step to multi-channel optical recorders/players which overcome some of the problems of the prior art multi-channel systems. A diode laser array system is generally more compact, has higher efficiency, and requires no external modulation.

SUMMARY OF THE INVENTION

In accordance with the principles of the present invention an optical system is provided which utilizes an array of solid state elements which emit coherent light beams.

In accordance with an aspect of the present invention an optical system for processing information on the surface of a record medium is provided. The system includes an array of solid state elements emitting respective coherent light beams having generally elliptical cross-sectional shapes. A first lens is provided for collecting the respective coherent light beams emitted by the array of solid state elements. This first lens has a flat field over the extent of the array such that the first lens collects the light emitted by each element in the array. Further, this first lens forms the respective coherent light beams into collimated light beams. A beam expander reshapes the cross-sectional shape of the collimated light beams. That is, the beam expander anamorphically expands the collimated light beams such that the cross-section of the collimated light beams is generally circular. Further, the system includes a second lens for focusing the collimated light beams as respective diffraction limited spots on the surface of the record medium.

DETAILED DESCRIPTION OF THE PREFERRED EMBODIMENTS

Figure 1:
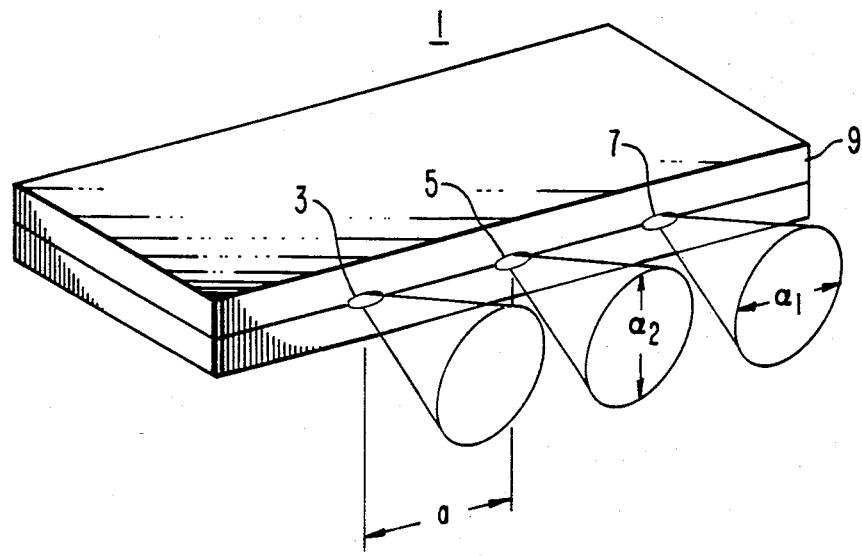
FIG. 1 shows a linear array of solid state laser elements which may be used in the present invention.

In FIG. 1, numeral 1 designates a semiconductor laser array. According to the invention, information can be simultaneously recorded on a plurality of tracks by employing a plurality of (illustratively, 3) lasing points 3, 5, 7 from a common substrate 9. The individual lasing points 3, 5, 7 are separated by distance a. The emitting areas of the laser diodes (lasing points) have high aspect ratios and hence widely different emission patterns for the long and short dimensions. For this reason, an anamorphic lens system is used to reshape the emission pattern into symmetrical beams so that the highest possible spot intensity can be obtained at the recording surface. Achieving the extremely high data rate requires operating multiple record/playback channels in parallel. Electrically modulating each laser diode separately allows recording independent parallel data tracks with an overall data rate that is a product of the data rate for each track and the number of tracks. Playback of the recorded information can be accomplished by lowering the power level to the array, inhibiting modulation, and detecting the reflected light from the disc with an array of photodetectors.

In general, due to the high aspect ratio of the emitting area of the laser diodes the far-field patterns of the light beams emitted from the lasers will be elliptical in cross-section. As shown in FIG. 1, the beam diverges at an angle $\alpha_1$ at $1/e^2$ intensity parallel to the junction plane and diverges at an angle $\alpha_2$ at $1/e^2$ intensity perpendicular to the junction plane. The anamorphic ratio may be defined by $\alpha_2/\alpha_1$. Illustratively, the anamorphic ratio for a diode of a double heterostructure with a large optical cavity is approximately 4.

Figure 2:
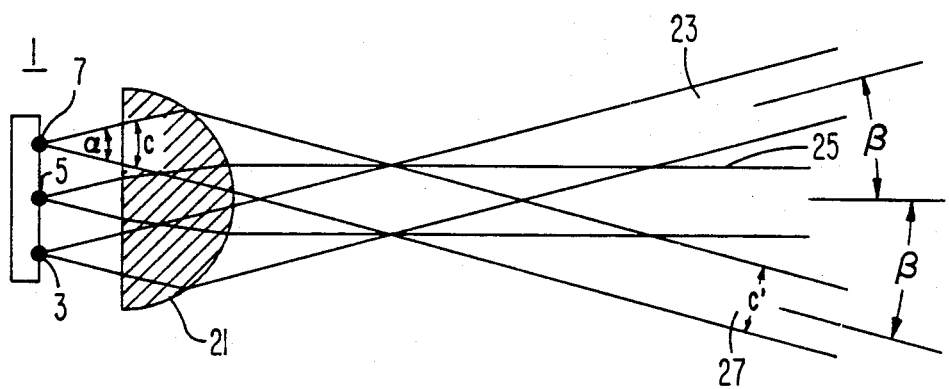
FIG. 2 illustrates how a collection objective collects and collimates the light beams emitted by an array of diodes as shown in FIG. 1.

Referring to FIG. 2, the collection objective and diode array according to the invention are shown. In the figures elements designated with like reference numerals are the same or similar items in the various figures. For single laser systems, a collection objective may be used to collect and collimate the light from a single lasing source and collimate it into a parallel beam. However, the light output from an array 1 of diodes 3, 5, 7 are collected into collimated, but not parallel, beams 23, 25, 27, respectively by a collection objective 21. Illustratively, collection lens 21 may be a plano microscope objective having a focal length of 12.5 millimeters and a numerical aperture of 0.4. In a three element system the beams from the sources at the extreme of the array, i.e., beams 23 and 27 diverge at angle $\beta$ with respect to the optic axis of the system. As the separation between the collection lens to the focusing lens (not shown) increases the beams 23 and 27 are further separated from each other. As a result a majority of the laser beams of the system may miss the aperture of the focusing lens. This problem can be solved to a certain extent by moving the lasing points 3, 5 and 7 closer together. However, from the viewpoint of the thermal and electronic interference of adjacent lasing points, the distance between adjacent points at the present state of the art should be about 150 micrometers. If the beams diverge too much the truncation of the beams becomes very large. When there are more than three lasing points the beams may not be introduced into the focusing lens.

Figure 3:
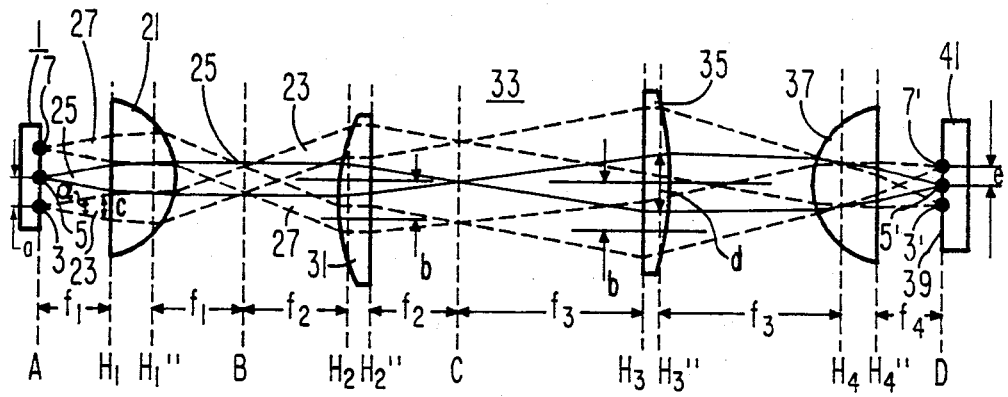
FIG. 3 illustrates an optical system which may be used in a multi-channel optical recorder/player in accordance with the principles of the present invention.

In accordance with the principles of the present invention multi-channel optics for a laser diode array are provided. FIG. 3 is a diagram showing the construction of one embodiment for the optics of the present invention. Beams 23, 25 and 27 are emitted from sources 3, 5 and 7, respectively of a laser diode array 1. A collection lens 21 is arranged one focal length distance from the laser device 1 to the primary principal plane of collecting lens 21 and renders the exiting beams as collimated beams 23, 25, 27. The collimated beams 23, 25, 27 are incident on the entrance lens 31 of anamorphic beam expander 33 which comprises cylindrical lens 31 and cylindrical lens 35 which are separated by the sum of their focal lengths ($f_2 + f_3$). The anamorphic beam expander 33 is separated from the collection objective 21 by the sum of the focal length $f_1$ of the collection objective 21 and of the focal length $f_2$ of cylindrical lens 31, i.e., the sum of $f_1 + f_2$. The separation b between adjacent beams entering cylindrical lens 31 is equal to (a) $(f_1 + f_2)/f_1$. The effect of the cylindrical beam expander 33 is to anamorphically expand beams 23, 25, 27 such that the beams that exit from cylindrical lens 35 are circular in cross-sectional shape. In other words, the beams that enter the anamorphic beam expander 33 are not affected in a plane perpendicular to the plane of the paper of the figure while, on the other hand, they are expanded by the ratio of $f_3/f_2$ in the plane of the paper of the figure. Final focusing lens 37 is positioned in the focal plane of lens 35, i.e., $f_3$ from lens 35, and is positioned from surface 39 of record medium 41 by a focal length of the focusing lens, i.e., $f_4$. In this arrangement of FIG. 3 the lasing spots 3, 5 and 7 are magnified and focused as diffraction limited spots 3', 5' and 7' on the surface of record medium 41. Illustratively record medium 41 may be of a type disclosed in U.S. Pat. No. 4,222,071 issued in the name of A. E. Bell et al. Illustratively a Bell-type record medium may be a disc having a light sensitive surface upon which ablative recording by the thermal effects of a focused laser beam may be made. Assuming that $\alpha_1$ is 12 degrees and $\alpha_4$ is 48 degrees providing an anamorphic ratio of four and that the separation of adjacent lasing points is 150 μm, lenses 21, 31, 35 and 37 may have focal lengths of illustratively 12.5 mm 37.5 mm, 150 mm and 5 mm, respectively. According to this example if the spacing between lasers is 150 μm the spacing between the beams at the entrance pupil to lens 31 will be 0.6 millimeters and the spacing e between the focused points at the surface 39 of record medium 41 will be equal to 20 μm. If 20 μm between the focused spots is two great the separation between tracks may be reduced by rotating the optical axis of the system with respect to the relative motion of the medium.

Figure 4:
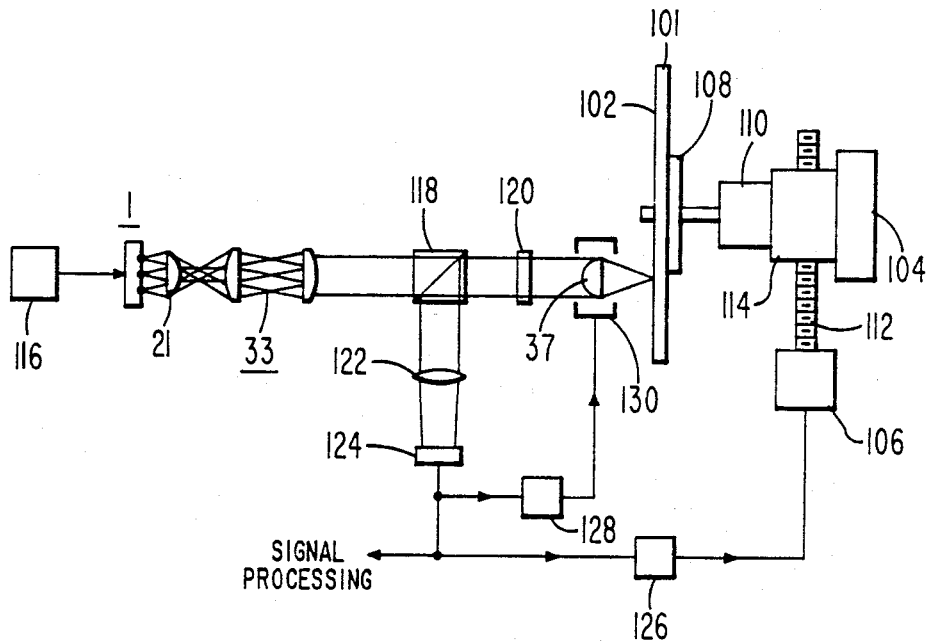
FIG. 4 is a diagrammatic view of an information processing system including an optical arrangement of the embodiment shown in FIG. 3.

Referring to FIG. 4, an optical system for recording and reading information from a disc shaped record medium will be described. A disc 101 having a light sensitive surface 102 (illustratively, of a Bell type) is provided for recording and playback. To provide optical scanning of the surface 102 of disc 101 transport stage 104 is moved linearly by motor 106 at a rate in accordance with desired recording or playback mode while disc 101 is rotated on turntable 108 by motor 110.

Transport stage 104 comprises a tracking motor 106 and a feedscrew 112 adapted to be rotated in response to rotations of motor 106. Feedscrew 112 is in mesh engagement with slide 114. When motor 106 is activated slide 114 moves on platform 115 so that the light beam focused on the disc surface moves radially. In operation the light output from laser array 1 is modulated by signal source 116. The beams from the laser array 1 are collected in collecting objective 21 and anamorphically expanded in beam expander 33. From there the beams are transmitted through polarizing beam splitter 118 and quarter-wave plate 120 to focusing lens 37. Focusing lens 37 focuses the beams to diffraction limited spots on surface 102 of disc 101. As the disc is rotated signal source 116 modulates the beams from laser array 1 such that the information from signal source 116 is recorded on the surface of the disc. The modulated record beams are focused on the disc surface to form a series of surface variations on the surface of the disc of varying duration and spacing as the disc rotates. The pattern of surface variations on the disc is recorded in consonance with the signal provided to the input from signal source 116.

In the read mode the intensity of the light emission of array 1 is reduced such that the surface of disc 101 is no longer affected. The polarization of the beams is such that on the first pass through polarizing beam splitter 118 the beams pass through without being reflected thereby. Transmission of the beams through quarter-wave plate 120 effects a shift of linear polarization to circularly polarized light and a second pass through quarter-wave plate 120 shifts the circularly polarized light back to linearly polarized which is 90° out of phase with respect to the input light. The beams that enter polarizing beam splitter 118 on the return are deflected by polarizing beam splitter 118 to enter lens 122. Lens 122 images the surface of the disc onto a plurality of detectors (not shown) on substrate 124. The signal outputs from the detectors on substrate 124 are passed to signal processing circuitry (not shown). Furthermore, the signals from detector 124 may be used to control the position of the beam landing point on the surface 102 by controlling via driver 126 the motor 106 for translating the disc. Additionally, the signal from the detectors on substrate 124 may be used to control the position of lens 37 to maintain the laser beams in focus on the surface of the disc by means of driver 128 which is coupled to a voice coil arrangement 130 for moving lens 37 along the optical axis.

Another advantage of the present invention is that the optics provide immunity to vignetting if the sources are off-axis. In general, the optics are insensitive to movement of a light source from the optical axis of the system (i.e., movement of a single source or multiple sources in the focal plane of the collection objective should not affect the quality of the image or images at the record medium surface).

While the principles of the present invention have been demonstrated with particular regard to the illustrated structure of the figures, it will be recognized that various departures from such illustrative structures may be undertaken in practice of the invention. For example, the lenses have been shown as single element devices, however, multiple element lenses may be used in their place.

What is claimed is:
1. An optical system for processing information on the surface of a record medium, comprising:

an array of solid state elements emitting respective coherent light beams having generally elliptical cross-sectional shapes;

a first spherical lens, having a focal length $f_1$, for collecting said respective coherent light beams emitted by said array of solid state elements, said first spherical lens having a flat field over the extent of said array such that said first spherical lens collects the light emitted by each element of said array and forming said respective coherent light beams into collimated light beams, said first spherical lens being positioned at a one focal length distance, $f_1$, from said array of solid state elements;

a beam expander for anamorphically expanding said collimated light beams to reshape the cross-section thereof such that the cross-section is generally circular, said beam expander including a first cylindrical lens having a focal length $f_2$ and a second cylindrical lens having a focal length $f_3$, said first cylindrical lens being positioned from said first spherical lens by a distance equal to the sum of their respective focal lengths, $f_1+f_2$, and said second cylindrical lens being positioned from said first cylindrical lens by a distance equal to the sum of their respective focal lengths, $f_2+f_3$;

a second spherical lens, having a focal length $f_4$, for focusing said collimated light beams as respective diffraction limited spots onto said surface of said record medium, said second spherical lens being positioned from said second cylindrical lens by a distance equal to the focal length, $f_3$, of said second cylindrical lens and being positioned from said record medium surface by a distance equal to the focal length of said second spherical lens, $f_4$; and means for providing relative motion between said second spherical lens and said record medium surface for maintaining said collimated beams focused as respective diffraction limited spots on said record medium surface.

2. The optical system according to claim 1 wherein said solid state elements are arranged in a linear array on a common substrate.

3. The optical system according to claim 2 wherein said array of solid state elements includes three diode lasers.

4. The optical system according to claim 3 wherein said solid state elements are spaced apart by 150 μm.

5. The optical system according to claim 3 wherein said first spherical lens includes a plano microscope objective.

6. The optical system according to claim 1 wherein the ratio of the major axis to the minor axis of said elliptical cross-sectional shape is approximately four.

7. The optical system according to claim 6 wherein the focal lengths $f_1$, $f_2$, $f_3$ and $f_4$ are equal to 12.5 mm, 37.5 mm, 150 mm and 5 mm, respectively.

* * * * *